Figure 1:
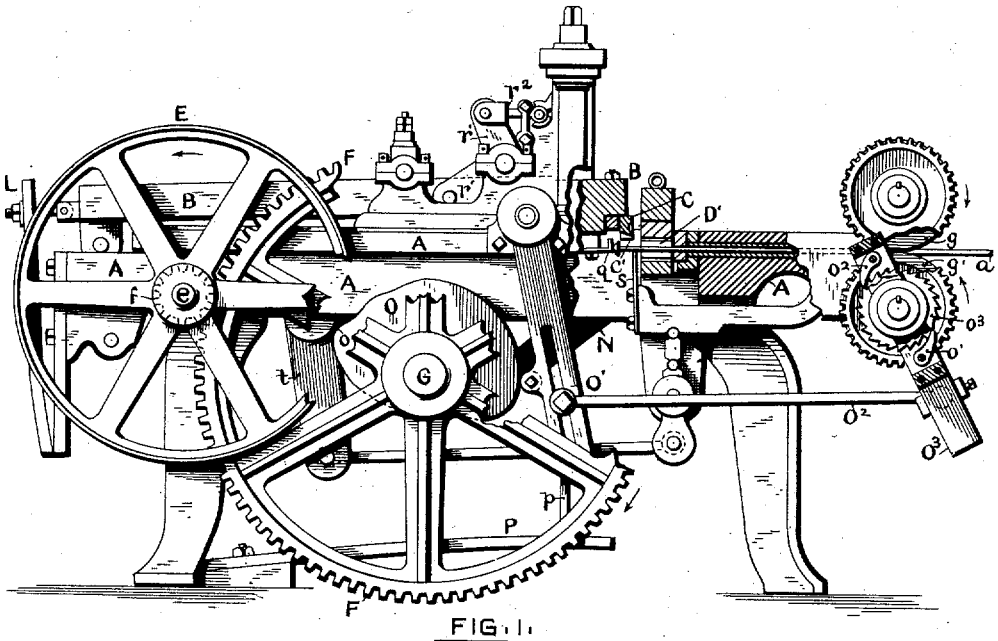

2 Sheets—Sheet 1.

W. E. WARD.

MACHINE FOR FORMING BOLT BLANKS.

No. 11,030. Reissued Sept. 17, 1889.

WITNESSES.

Joseph H. Marshall

Howard E. Marshall

INVENTOR.

William E. Ward

N. PETERS, Photo-Lithographer, Washington, D. C.

W. E. WARD.

MACHINE FOR FORMING BOLT BLANKS.

No. 11,030. Reissued Sept. 17, 1889.

WITNESSES.

Joseph H. Marshall

Howard E. Marshall

INVENTOR.

William E. Ward

N. PETERS, Photo-Lithographer, Washington, D. C.

UNITED STATES PATENT OFFICE.

WILLIAM E. WARD, OF PORT CHESTER, NEW YORK.

MACHINE FOR FORMING BOLT-BLANKS.

SPECIFICATION forming part of Reissued Letters Patent No. 11,030, dated September 17, 1889.

Original No. 341,970, dated May 18, 1886. Application for reissue filed July 11, 1889. Serial No. 317,241.

*To all whom it may concern:*

Be it known that I, WILLIAM E. WARD, a citizen of the United States, residing at Port Chester, in the county of Westchester and State of New York, have invented a new and useful Improvement in Machines for Forming Bolt-Blanks from Cold Rods of Metal; and I do hereby declare the following specification, taken in connection with the accompanying drawings, forming a part of the same, to be a full, clear and exact description thereof.

The feature of the present invention which distinguishes it from all former machines for heading-bolts with which I am acquainted is, that the rods from which the bolt-blanks are to be consecutively formed is fed forward a succession of times through the gripping-jaws, which hold and sustain the rod to enable the head to be formed by a succession of upsetting operations, each upsetting action of the head-forming ram being consequent upon a fresh feeding of the rod, and the finished bolt-blank is severed from the rod by cutting devices located and operating in front of the anvil-faces of the gripping-jaws after the bolt-head has been fully formed on the end of the rod and the rod has been fed forward a distance sufficient to expose enough of its length to make the complete blank. By my invention I am enabled to form heads of any desired size upon either square or round rod-stock for bolt-blanks, and in case round stock is used a square under the head of sufficient length for all ordinary requirements of a bolt can be obtained.

My invention can be applied to any ordinary single-acting bolt-heading machine known for many years in the art by organizing the same, so that the mechanism which feeds the rod through the gripping jaws or dies shall be arranged, first, to feed forward the rod beyond the anvil-faces of such jaws or dies a prescribed distance to enable the heading-ram, when it advances, to upset the portion of the rod so projecting, in which respect the action is analogous to that performed by ordinary bolt-heading machines; second, by arranging the feeding mechanism in timely relation to the retreating movement of the heading-ram, so that the rod will be fed forward through the gripping jaws or dies for a further distance to enable the heading-ram when it next advances to perform a second upsetting operation thereon; third, if so desired, by arranging the machine so as to effect successive operations of rod-feeding and head-upsetting until the completed head of any required size is formed; and, fourth, by causing the feeding mechanism to advance the rod with the bolt-head fully formed upon its end a distance sufficient to expose enough of its length to make a complete bolt-blank, and then bringing into action cutting devices located and operating in front of the anvil-faces of the jaws or dies to sever the blank from the rod, the distinguishing characteristic of my invention being the performance of a succession of feeding operations while the rod is contained between the same pair of gripping jaws or dies, and a succession of upsetting operations upon such intermittingly-fed rod, whereby a full head of any size can be progressively formed from a rudiment to the completed whole, and, finally, advancing the headed rod a distance sufficient to enable a blank of the desired length to be cut therefrom, and severing such blank from the rod by cutting devices operating in front of the anvil-faces of the gripping jaws or dies.

Figure 2:
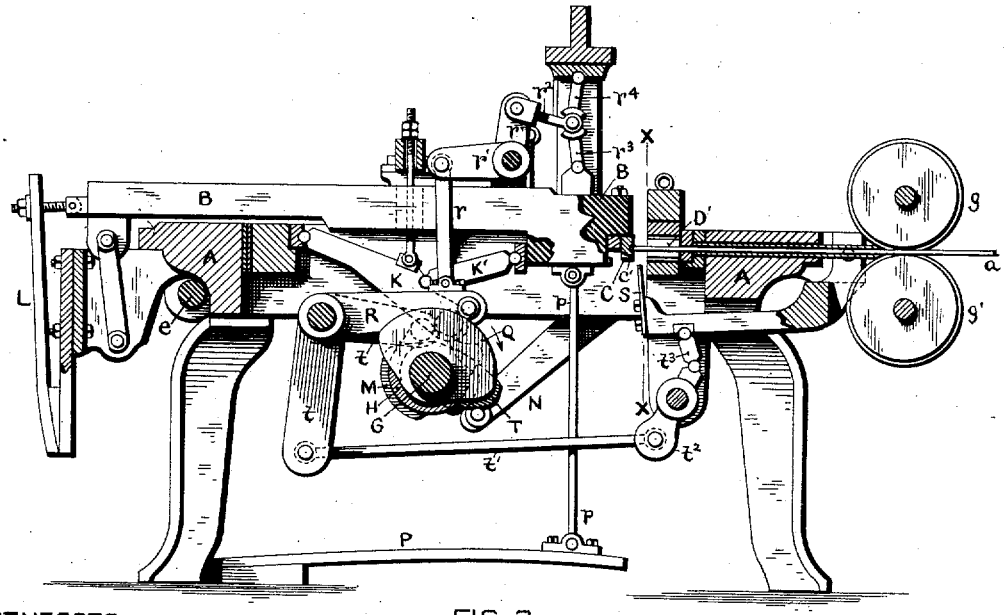
Figure 3:
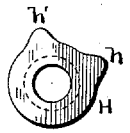
Figure 4:
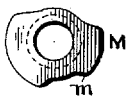
Figure 5:
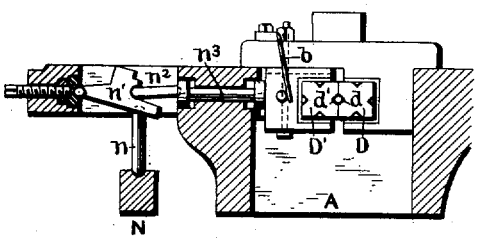
Figure 6:
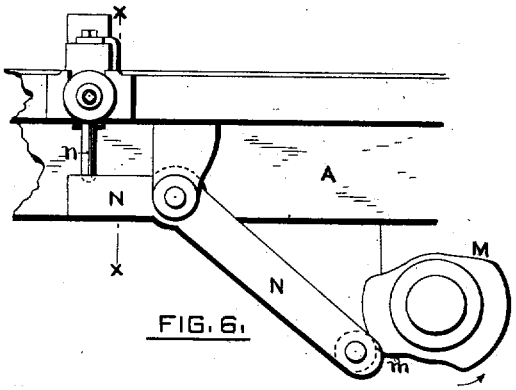
Figure 9:
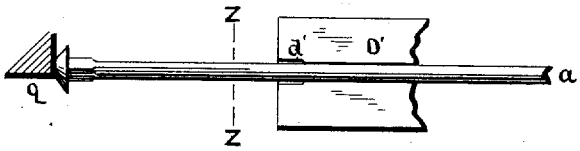
Figure 7:
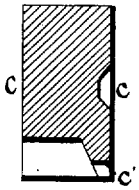
Figure 8:
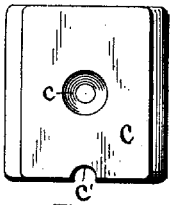
Figure 10:
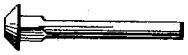
Figure 11:
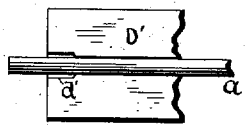
Figure 12:
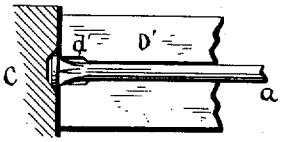
Figure 13:
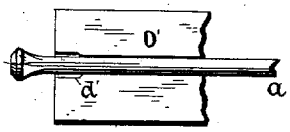
Figure 14:
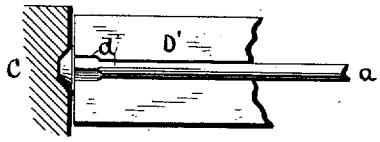

In the accompanying drawings, Figure 1 represents in side view and partial section a machine for forming bolt-blanks in accordance with the invention. Fig. 2 shows a longitudinal section of the same. Figs. 3 and 4 represent, respectively, the cam for giving the horizontal forward movements to the ram and the cam for causing the gripping jaws or dies to hold the rod. Fig. 5 shows an end view of the gripping jaws or dies and the mechanism through which the movable jaw is advanced. Fig. 6 shows a side view of the cam and lever for operating the mechanism. Figs. 7 and 8 represent, respectively, a vertical section and a face view of the matrix or die for shaping the head of the blank. Fig. 9 shows a side view of one of the gripping-jaws and the headed rod fed forward against a gage or stop preparatory to severing the blank from the rod. Fig. 10 represents the blank. Fig. 11 shows the rod projecting beyond the face of one of the gripping-jaws after the blank has been severed and in readiness for the first upsetting operation. Fig. 12 shows the matrix or die acting upon the rod to form a rudimentary bolt-head thereon. Fig. 13 represents the rod having a rudimentary bolt-head fed forward preparatory to the second upsetting operation. Fig. 14 represents the matrix or die acting upon the rod to complete the bolt-head.

A represents the frame of the machine, in and upon which the various parts are mounted, the said frame being similar to those of ordinary bolt-heading machines.

B is the heading-ram, which is mounted to have the usual reciprocating movements in vertical and horizontal planes. It carries upon its forward end the usual die-block C, provided with a matrix *c*, Figs. 7 and 8, corresponding with the form of the finished bolt-head.

D D′ are the gripping jaws or dies. Through these the rod *a*, out of which the bolt-blanks are to be formed, is to be fed, such rod being gripped by the jaws while the upsetting operation is being performed, the grip being relaxed at the time the rod is being fed.

Power is applied to the machine through the pulley E, keyed to the transverse shaft *e*, mounted in suitable bearings on the frame.

Upon the shaft *e* is keyed a pinion *f*, (shown in dotted lines at Fig. 1,) the teeth of which engage with the teeth of a gear-wheel F, keyed to the transverse shaft G. Upon this latter shaft the various cams which control the movements of the heading-ram and the feeding mechanism are mounted.

*g g′*, Figs. 1 and 2, are the feeding-rollers, which are made to act to feed forward the rod intermittingly in a well-understood way.

Assuming the rod *a* of bolt-stock to have been fed forward a prescribed distance, as indicated in Fig. 11, the heading-ram advances by the action of the tooth *h* of the cam H upon the arm K of the toggle K K′. The toggle is thereby straightened, and its rear end being immovable because resting upon the frame A, as shown in Fig. 2, the ram is moved horizontally toward the gripping jaws or dies D D′. The effect is to upset the end of the rod, and the result is to produce a partially-formed head, as illustrated at Fig. 12. The continued revolution of the cam H allows the ram to be retracted by the spring L. Cotemporaneously, or nearly so, with this backward movement of the ram the grip of the jaws D D′ is relaxed by the influence of the spring *b*, Fig. 5, upon the jaw D′, which spring is now allowed to act for the reason that the cam M, Figs. 2, 4, and 6, no longer operates through the lever N, pin *n*, toggle $n'$ $n^2$, and pin $n^3$, Figs. 5 and 6, to hold the gripping-jaws shut. Thereupon the feed-rollers *g g′* are caused to advance the partially-headed rod against a stop (preferably the die C, which remains in alignment with the rod, as shown in Fig. 2) by the influence of the rise *o* on the cam O, Fig. 1, which acts upon a pivoted arm O′, connected by a rod $O^2$ to an arm $O^3$, carrying pawls $o'$ $o^2$, which engage a ratchet-wheel $o^3$, secured to the shaft upon which the lower feed-roll *g′* is mounted. The rod, with its partially-formed head, will now project beyond the anvil-face of the gripping-jaws, as illustrated at Fig. 13. The gripping-jaws now close again by the continued rotation of the cam M through the influence upon the lever N of the rise *m* on said cam. The heading-ram now for the second time advances through the influence of the tooth *h′* of the cam H upon the toggle K K′, and again upsets the rod, thereby completing the head of the bolt-blank, as illustrated at Fig. 14.

The above-described operations of feeding forward the rod and of causing the ram to advance to further upset the head may be repeated any desired number of times by increasing the capacities of the cams O, M, and H, controlling, respectively, the feed mechanism, the gripping-jaws, and the horizontal movements of the ram.

The completely-formed bolt-head having been made upon the end of the rod, the ram is retracted by the spring L to clear the same from the rod. The ram-head is then elevated, in a very familar way in this class of machines, by the influence of a spring P, Figs. 1 and 2, which is connected with the ram by a rod *p*, and acts, when permitted by the contour of the cam Q, in the usual manner. The ram-head having been elevated, the rod, with the fully-formed head thereon, is now fed forward, preferably against a stop *q*, Figs. 1 and 9, for a distance equal to the full length of the bolt-blank, and for such distance, in addition, as will furnish the metal for the first operation of forming the head on the succeeding blank, as illustrated at Fig. 9, in which the length of the finished bolt is indicated by the dotted line Z Z, upon which line the blank is to be severed from the rod.

The means shown in the drawings for severing the blank from the rod consist of a movable rest S, Figs. 1 and 2, which is to be brought up in front of the anvil-faces of the gripping-jaws or dies into a position to support the rod during the severing operation, and a cutter *c′*, which is formed by a cavity in the lower edge of the die-block C, Figs. 1, 2, 7, and 8, which die-block is secured to one end of the ram, as hereinbefore described. The rest S is brought up to support the rod by a cam T, acting through the bell-crank lever *t*, connecting-rod *t′*, and toggle-lever $t^2$ $t^3$. The rod being supported by the rest S, the ram-head is made to descend by the influence of the cam Q, Fig. 2, which acts upon a lever R. This lever is connected by a rod *r* to a bell-crank lever *r′*, and the lever *r′* is connected by a rod $r^2$ to the toggle-arms $r^3$ $r^4$, one of which bears upon the ram-head and the other upon the frame of the machine, as shown in Fig. 2. The descent of the cutter *c′* severs the blank from the rod and brings the matrix *c* in the die-block C into alignment with that portion of the rod which is in the gripping-jaws in readiness to act upon the end of the rod to upset the same into the rudiment of a head for the next succeeding blank to be made.

The operations before described are to be repeated in forming successive bolt-blanks.

If bolt-blanks made from round rods are to have a "square" under the head, the gripping jaws or dies D D′ are provided, respectively, with the necessary die-recesses *d d′*, Figs. 5, 9, 11, 12, 13, and 14, well known in the art, so as to produce such square, as shown in Figs. 9, 10, and 14. It will be readily understood that by a succession of feeding operations and a succession of upsetting operations in the formation of the head the square under the same will be progressively formed, and will necessarily be more perfect in shape, and may be greater in length than when formed as heretofore practiced, which is a feature of importance.

It is apparent that in carrying out my invention it is not necessary that the rod should be fed forward to the same extent preliminary to each upsetting operation; but the extent to which the rod may be fed for the successive operations may be varied as experience in working different descriptions of metal may require for producing the best results. It will also be evident to constructors of this class of machinery that the specific devices and mechanical contrivances for accomplishing the operations hereinbefore described can be greatly varied to produce the same result of progressively feeding forward a rod of stock for bolt-blanks, and subjecting such rod, after each feeding operation, to the action of a ram for upsetting the metal, and thereby progressively forming the bolt-head thereon—as, for instance, instead of employing single cams or disks having more than one cam-face or salient projection, respectively, for producing the horizontal movements of the ram, the movements of the gripping-jaws, and the feeding of the rod, separate cams may be used for causing each definite movement of these parts, and such cams may be located upon a single shaft, or upon more than one shaft, as will be readily understood.

What I claim as my invention, and desire to secure by Letters Patent, is—

1. The combination, substantially as hereinbefore set forth, of mechanisms, substantially as described, for feeding forward at successive times the rod from which blanks are to be made, for gripping at successive times the rod after it has been fed, and for upsetting at successive times the end of the rod to form the head, such mechanisms being arranged as described, so that the said operations of feeding, gripping, and upsetting, respectively, shall follow each other in series, whereby a complete head can be progressively formed on the end of the rod, and cutting mechanism operating in front of the anvil-faces of the grippers to sever the blank from the rod after the rod with a full-formed bolt-head thereon has been fed forward.

2. The method, substantially as hereinbefore set forth, of forming bolt-blanks from cold rods of metal, which consists in a plurality of feedings, grippings, and upsettings upon the rod before severing, whereby the head of the blank is progressively formed, then advancing the rod a distance sufficient to expose enough of its length for a complete blank, and then severing the blank from the rod by cutting devices operating in front of the anvil-faces of the gripping-jaws.

WILLIAM E. WARD.

Witnesses:
JOSEPH H. MARSHALL,
HOWARD E. MARSHALL.